Patented Aug. 13, 1946

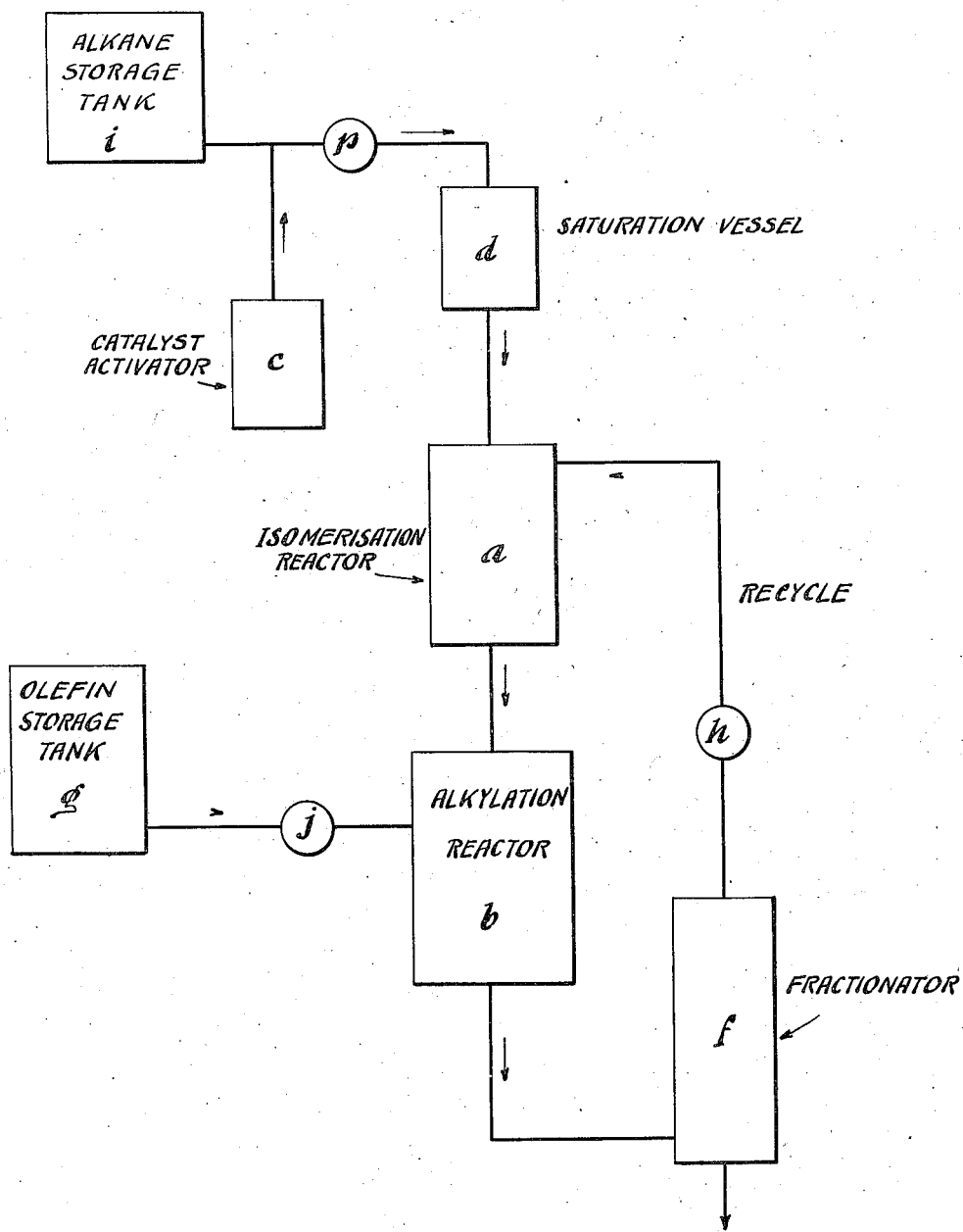

2,405,565

UNITED STATES PATENT OFFICE 2,405,565

SYNTHESIS OF HYDROCARBONS

Eric William Musther Fawcett and Gwilym Islwyn Jenkins, Sunbury-on-Thames, England, assignors to Anglo-Iranian Oil Company Limited, London, England, a British joint-stock corporation Application March 20, 1944, Serial No. 527,170
In Great Britain April 23, 1943

3 Claims. (Cl. 260—683.4)

This invention relates to processes for the alkylation of paraffinic hydrocarbons with olefines to produce saturated hydrocarbons of higher molecular weight, using a halide catalyst such as an aluminium halide. Hydrocarbons synthesised by such processes normally have a branched chain structure by virtue of which valuable components of fuel are produced of a high octane rating for internal combustion engines.

The alkylation of isoparaffins with olefines may be readily brought about in the presence of one of many catalysts, but the corresponding synthesis using a normal paraffin is exceedingly difficult, and where such a reaction has been observed it probably takes place through the primary stage of isomerisation of the normal paraffin. If therefore it is desired to alkylate a normal paraffin with an olefine it is usually necessary first to subject the normal paraffin to isomerisation, and to isolate the branched chain hydrocarbon by fractionation or other means from the reaction product in a substantially pure state and then carry out the alkylation reaction in a separate stage. In order to avoid polymerisation of the olefine and other undesirable side reactions the molecular ratio of isoparaffin to olefine in the feed to the alkylation unit is made substantially greater than unity, such excess of isoparaffin acting as a diluent to the highly reactive olefine.

It is known that halides such as ferric chloride, boron trifluoride, zinc chloride, aluminium bromide and aluminium chloride are active catalysts for the isomerisation of normal paraffin hydrocarbons as well as for the alkylation of isoparaffin hydrocarbons with olefines, and that hydrogen chloride is a catalyst activator for both the isomerisation and alkylation reactions.

We have now found that the alkylation of a normal paraffin with an olefine may be effectively carried out in a two stage continuous flow isomerization-alkylation process whereby a substantial economy of catalyst and catalyst activator is achieved and both processes operated under their optimum conditions of pressure, temperature and contact time. By such means the intermediate fractionation of the isomerisation reaction product to obtain the isoparaffin is avoided, as we have found that the presence of the normal paraffin is not detrimental to the subsequent alkylation reaction, but that the paraffin acts as a diluent to suppress the undesirably high tendency of the olefine to polymerise.

Owing to the volatility of the halide catalyst at usual isomerising temperatures, catalyst vapour is normally present in the exit hydrocarbon vapour stream from the isomerisation reactors or in the case of liquid phase isomerisation processes is dissolved in the issuing liquid product. The reaction mixture containing a substantial proportion of isoparaffin together with the halide catalyst and hydrogen halide catalyst activator, if used, is in the manner of our invention passed directly to an alkylation reactor, which is packed with catalyst supporting material such as activated carbon, Activated Alumina, naturally occurring bauxites or other highly porous carrier in granular state. The olefine in substantially less than equi-molecular proportion with respect to the total saturated hydrocarbons is also passed over the inert carrier in the alkylation reaction. In this way alkylation of the isoparaffin present in the isomerisation reaction product is brought about by the supported halide catalyst formed when the halide catalyst present in the isomerised hydrocarbon stream is brought on to the catalyst support in the alkylation reactor.

The process of the invention is hereinafter described with reference to one specific application comprising a two stage continuous flow process for alkylating normal butane with ethylene to produce a fuel of high antiknock value. One arrangement of the flow system is shown in the accompanying drawing. The process in the isomerisation stage is carried out according to the advantageous method of operation described in the complete specification filed pursuant to the prior application for patent in the United States, Serial No. 417,097, dated October 30, 1941, in the presence of a catalyst consisting of a highly porous supporting material continuously impregnated with aluminium chloride by vapour phase transference from a saturation vessel packed with granular aluminium chloride.

The conditions are so determined that the concentration of aluminium halide vapour in the hydrocarbon stream does not exceed a concentration equivalent to the saturation pressure at the reaction temperature, so that thus there is no deposition of solid aluminium chloride in the reaction vessel.

Normal butane or a hydrocarbon fraction consisting substantially of normal butane is passed from the storage tank $i$ by means of the pump $p$ through the saturation vessel $d$, which is packed with granular aluminium chloride. Hydrogen chloride catalyst activator is added to the butane stream as and when required from the tank $c$. The isomerisation reactor $a$ is packed with a highly porous supporting material and both the reactor $a$ and the saturation vessel $d$ are maintained under such conditions of temperature and operating pressure that the hydrocarbon is in the condition of vapour, the preferred values of these operating conditions being given in the specification filed pursuant to the said prior application in the United States. The saturation vessel $d$ is maintained at a determined temperature to introduce the desired proportion of aluminium chloride vapour into the vapourized hydrocarbon. The temperature may be determined from the vapour pressure-temperature curve for aluminium chloride prepared from the data available in the International Critical Tables, vol. 3, pp. 207 and 208. The butane stream leaving the saturator $d$ carrying with it a proportion of aluminium chloride vapour is passed through the reactor $a$ where isomerisation of the normal butane takes place in the presence of the supported aluminium chloride catalyst formed. After a comparatively short operating period the support in the isomerisation reactor $a$ becomes fully impregnated with aluminium chloride and henceforth the exit stream from the reactor $a$ contains aluminium chloride vapour in an amount equal to that entering the reactor $a$ from the saturator $d$. Complete isomerisation of the normal butane is not possible, as the reaction proceeds to an equilibrium, and the conditions of contact time, temperature and pressure are generally so chosen that the butane stream leaving the reactor $a$ consists of approximately an equimolecular mixture of normal butane and isobutane. This mixture together with its content of aluminium chloride catalyst vapour and hydrogen chloride activator is passed directly to the alkylation reactor $b$ into which is also fed the ethylene from the storage vessel $g$ by the pump $j$. The ethylene feed is only a minor molecular proportion of the total hydrocarbon feed.

The conditions in the reactor $b$ are preferably so chosen that practically no ethylene remains unreacted. The product from the alkylation vessel $b$ passes to the fractionating column $f$ from which the butanes and hydrogen chloride are taken as overhead and returned by the pump $h$ to the isomerisation vessel $a$, the alkylate being taken as bottoms from the column $f$. If reaction with the ethylene is not complete a second fractionation is necessary to remove this component, before recycling the butane.

It is to be understood that although the invention is described in detail with reference to the alkylation of normal butane by ethylene, it is equally applicable to other combinations of olefines and paraffins and especially those boiling in the gasoline range. Further, either isomerisation or alkylation, or both may be carried out either under liquid or vapour phase conditions and with atmospheric or superatmospheric operating pressures, which need not necessarily be the same for both isomerisation and alkylation. As to operating temperature, isomerisation will generally operate in the range 50–150° C. and alkylation at a somewhat lower temperature in the range 0–100° C.

The following is an example of the process conditions that may be employed:

*Example.*—Normal butane such as is commercially available was passed at the rate of 20 volumes of vapour per minute in admixture with hydrogen chloride gas at the rate of 0.4 volumes per minute through an aluminium chloride saturator maintained at 110° C., and thence through an isomerisation reactor packed with granular roasted bauxite maintained at 110° C. The exit stream from this reactor which contained 45% of isobutane was passed together with its aluminium chloride vapour (2.2% by weight of the total exit gas stream) and hydrogen chloride into the alkylation reactor into which was also fed ethylene gas at the rate of 5 volumes per minute. The alkylation reactor was packed with granular roasted bauxite maintained at 85° C. The liquid alkylate product from the system contained 10% by volume of isopentanes and 60% of hexanes which consisted essentially of 2:3 dimethylbutane, the remainder being higher boiling paraffinic hydrocarbons.

We claim:

1. A two stage continuous flow process of isomerization and alkylation of normal paraffins for the production of saturated hydrocarbons of higher molecular weight, using a halide catalyst, which comprises the steps of introducing into a hydrocarbon stream having a normal paraffin content a small proportion of halide catalyst not exceeding a concentration sufficient to saturate the feedstock at the isomerisation reaction temperature; passing the catalyst containing stream through an isomerisation reaction zone and contacting said stream therein, under conditions of temperature, pressure and contact time favouring isomerisation of the normal paraffin content of the stream, with a highly porous adsorptive material fully impregnated with the halide catalyst substantially in adsorbed relation only thereto, the catalyst content of said stream being substantially unchanged in transit through said zone; directly commingling the catalyst containing stream of reaction mixture with an olefin stream and passing the combined stream with its olefine-catalyst content through an alkylation reaction zone and contacting the combined stream therein under conditions of temperature, pressure and contact time favouring alkylation of its isoparaffinic content with a highly porous adsorptive material; and, fractionating the exit stream of alkylation reaction mixture to separate the alkylate from the substances adapted for recycling to the isomerisation stage.

2. A two stage continuous flow process of isomerisation and alkylation of normal paraffins for the production of saturated hydrocarbons of higher molecular weight, using a halide catalyst, which comprises the steps of introducing into a hydrocarbon vapour stream having a normal paraffin content a small proportion of halide catalyst vapour not exceeding a concentration equivalent to the saturation pressure of the catalyst at the isomerisation reaction temperature by passing said vapour stream through a catalyst saturating zone and over a body of solid halide catalyst contained therein under conditions of temperature and pressure effective to establish the desired concentration of catalyst vapour in said stream; passing the catalyst containing vapour stream through an isomerisation reaction zone and contacting said stream therein, under conditions of temperature, pressure and contact time favouring vapour phase isomerisation of the normal paraffinic content of the stream, with a highly porous adsorptive material fully impregnated with the halide catalyst substantially in adsorbed relation only thereto, the catalyst content of said stream being substantially unchanged in transit through said zone; directly combining the catalyst-containing vapour stream of reaction mixture issuing from said isomerisation zone with an olefine stream and passing the combined vapour stream with its olefine-catalyst content through an alkylation reaction zone and contacting it under conditions of temperature, pressure and contact time favouring vapour phase alkylation of its isoparaffinic content with a highly porous adsorptive material; and, fractionating the vapour stream of reaction mixture issuing from said alkylation zone to separate the alkylate from the substances adapted for recycling to the isomerisation stage.

3. A two stage continuous flow process of isomerisation and alkylation of normal butane for the production of saturated hydrocarbons of higher molecular weight, which comprises the steps of passing a stream of gaseous normal butane at the rate of about 20 volumes per minute in admixture with hydrogen chloride gas at the rate of about 0.4 volume per minute through an aluminium chloride saturator containing solid aluminium chloride maintained at about 110° C. and thence through an isomerisation reactor packed with granular roasted bauxite maintained at about 110° C.; passing the exit stream from the reactor together with its aluminium chloride vapour and hydrogen chloride into an alkylation reactor packed with granular roasted bauxite maintained at about 85° C. together with gaseous ethylene added at the rate of about 5 volumes per minute; and, separating the saturated hydrocarbons of higher molecular weight from the unreacted butane.

ERIC WILLIAM MUSTHER FAWCETT.
GWILYM ISLWYN JENKINS.